J. DOUCETTE.
BRAKE FOR MOTOR VEHICLES.
APPLICATION FILED AUG. 31, 1917.

1,256,446.

Patented Feb. 12, 1918.
2 SHEETS—SHEET 1.

WITNESSES

INVENTOR
James Doucette
BY Victor J. Evans
ATTORNEY

J. DOUCETTE.
BRAKE FOR MOTOR VEHICLES.
APPLICATION FILED AUG. 31, 1917.
1,256,446.
Patented Feb. 12, 1918.
2 SHEETS—SHEET 2.
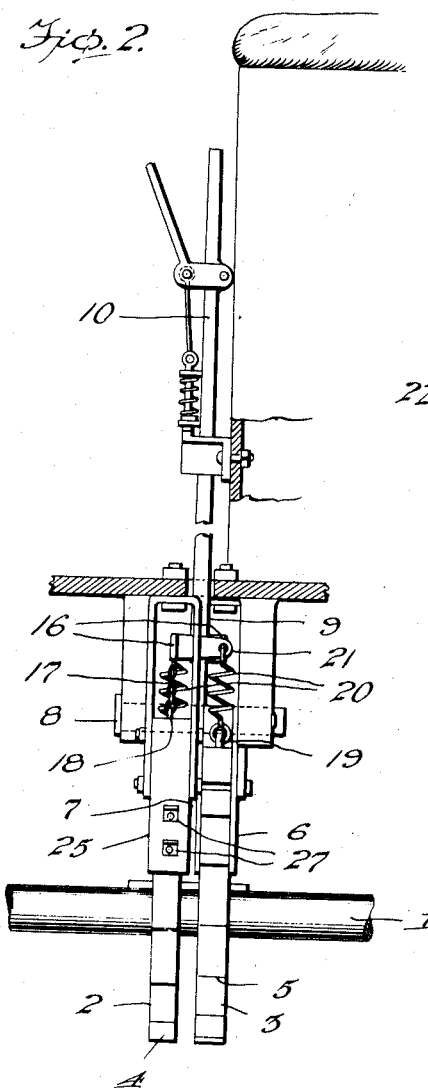
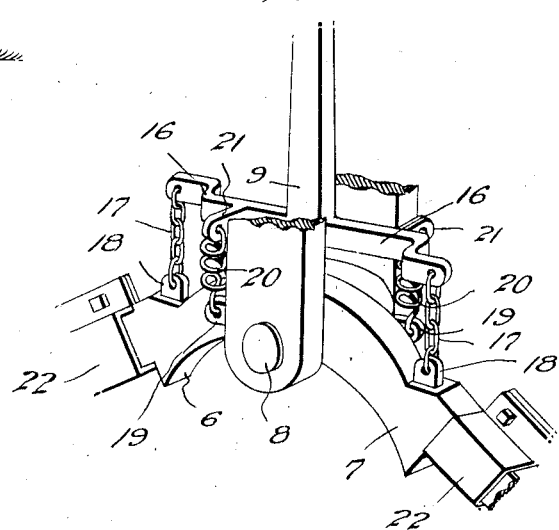
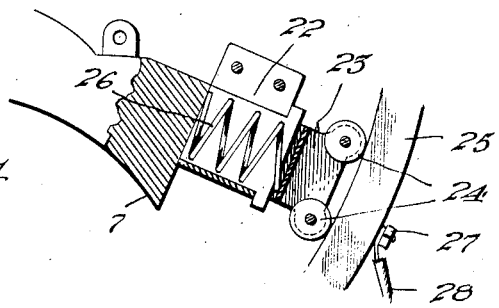
WITNESSES
INVENTOR
James Doucette
BY Victor J. Evans
ATTORNEY

UNITED STATES PATENT OFFICE.

JAMES DOUCETTE, OF GEM, IDAHO.

BRAKE FOR MOTOR-VEHICLES.

1,256,446.  Specification of Letters Patent.  Patented Feb. 12, 1918.

Application filed August 31, 1917. Serial No. 189,182.

*To all whom it may concern:*

Be it known that I, JAMES DOUCETTE, a citizen of the United States, residing at Gem, in the county of Shoshone and State of Idaho, have invented new and useful Improvements in Brakes for Motor-Vehicles, of which the following is a specification.

This invention relates to brakes for motor vehicles, the object in view being to provide what may be termed an automobile safety device in the form of a brake which, after being set, will operate automatically to lock one of the rotary shafts of a motor vehicle so as to prevent the vehicle from descending a steep grade in case the operator should stall the engine.

A further object of the invention is to provide a safety appliance of the character above referred to which may be used to prevent the machine from descending a grade while moving either in a forward or rearward direction.

Another object of the invention is to provide a safety appliance of the character referred to which may be used to prevent theft of the vehicle. Another object in view is to provide means whereby an alarm will be sounded when the safety appliance is set to operate. This alarm is valuable to assure the authorized operator of the vehicle that the emergency brake is set in readiness for operation, and it also serves to notify persons in the vicinity of the vehicle when an unauthorized person is attempting to operate the vehicle.

With the above and other objects in view, the invention consists in the novel construction, combination and arrangement of parts, herein fully described, illustrated and claimed.

In the accompanying drawings:—

Fig. 2 is a similar view taken at a right angle to Fig. 1.

Fig. 3 is a perspective view of the lower part of the brake setting lever, showing the pawls and the controlling means therefor.

Fig. 4 is a fragmentary section showing one of the circuit closers.

Figure 1:
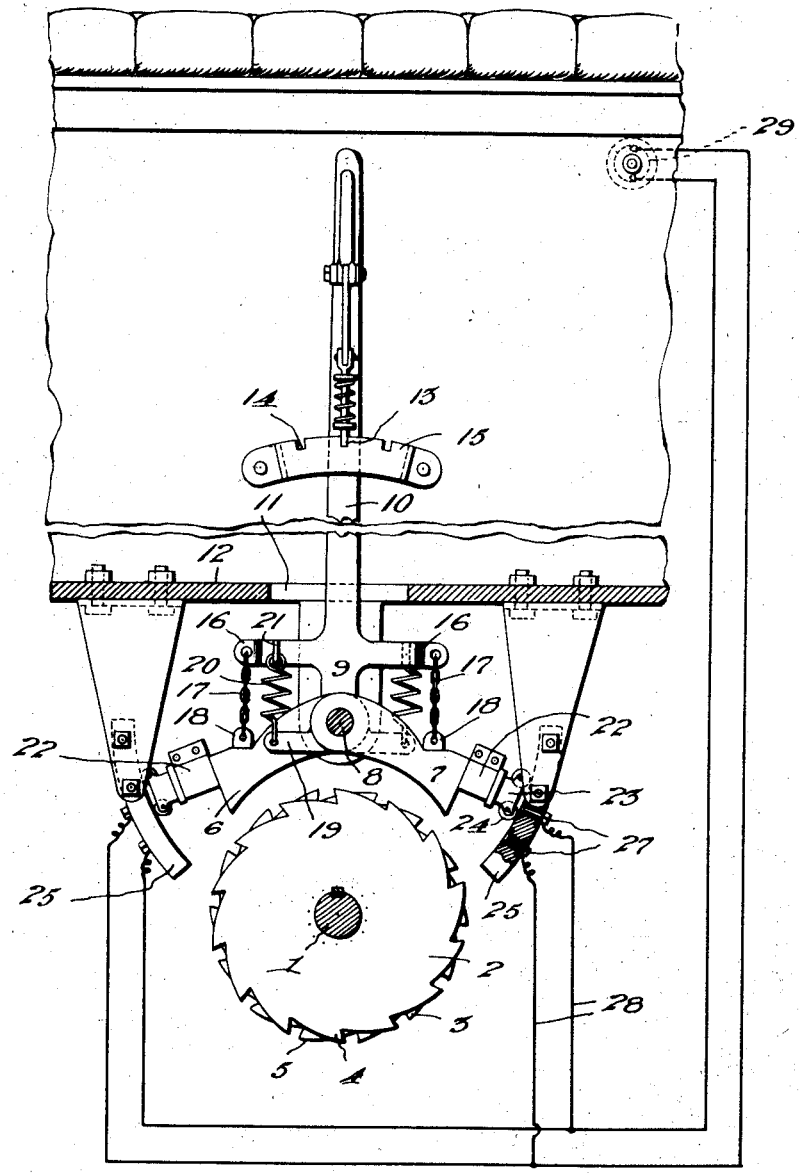
Figure 1 is a fragmentary view of a sufficient part of a motor vehicle to illustrate the safety device or brake in its applied relation thereto.

The mechanism herein shown and described is adapted to be used in conjunction with any rotary shaft of the vehicle, such shaft being indicated at 1. The shaft 1 may for example be one of the transmission shafts of the motor vehicle and in carrying out the present invention, I mount two ratchet wheels 2 and 3 on the shaft 1, each of said ratchet wheels being keyed or otherwise fastened to the shaft as indicated in Fig. 1. The teeth 4 of one ratchet wheel face in the opposite direction from the teeth 5 of the other ratchet wheel. The ratchet wheels 2 and 3 are preferably arranged in close proximity to each other in order that the pawls co-acting therewith may also be arranged in compact formation as indicated in Fig. 2.

Coöperating with the ratchet wheel 2 is a pawl 6 and coöperating with the ratchet wheel 3 is another pawl 7. Both of these pawls have their adjacent ends in overlapping relation to each other and mounted upon a pivot pin 8 of which the lower arm 9 of a lever 10 is fulcrumed. The lever 10 is shown as extending upwardly through a slot or opening 11 in the floor of a vehicle or in the top of a transmission casing, said floor or plate being indicated at 12. The lever 10 is also equipped with a thumb-latch 13 which is adapted to engage anyone of three notches 14 in an arcuate rack 15 fastened to any convenient part of the vehicle.

Extending laterally from the lever 10 are two arms 16 to which are attached the upper extremities of flexible connections 17, such as chains, the lower extremities of said connections being attached to ears 18 on the pawls 6 and 7. The connections 17 serve as means for limiting the downward movement of the pawls 6 and 7. Each of the pawls is provided with an arm 19 to which is attached one extremity of a spring 20, the opposite extremity of which is attached to a lateral projection or lug 21 on one of the arms 16 of the lever 10. Springs 20 are employed to yieldingly hold the pawls in engagement with their respective ratchet wheels 2 and 3 when the apparatus is set to operate.

Carried by the free end of each pawl is a circuit closer comprising a tubular guide 22 having a fixed relation to the respective pawl, said circuit closer also comprising a slidable member 23 which carries a pair of contact rollers 24 movable in contact with an arcuate plate or contact strip 25 described on the arc of a circle of which the pivot 8 is the center. The rollers 24 are maintained in contact with the respective contact piece 25 by means of a compression spring 26 contained in the tubular guide 22. Each of the contact strips or pieces 25 has inserted therethrough a pair of contacts 27 arranged at the same distance apart as the rollers 24. Therefore at a certain point in the movement of each pawl, the circuit closer will bridge the contacts 27 and close a circuit including the wires 28 which lead to and from the contacts 27, and also a sealed or secret horn 29 and a source of electrical energy (not shown).

From the foregoing description taken in connection with the accompanying drawings, it will now be understood that when the lever 10 is moved from its central position to one side, one of the pawls will be moved into engagement with the respective ratchet wheel so as to prevent the machine from moving down a grade in case the engine should stall. When the pawl is in engagement with its ratchet wheel, by reason of the respective spring 20, said pawl clicks over the teeth of that ratchet wheel and when the vehicle comes to a stop, said pawl will positively engage the teeth of that ratchet wheel and prevent the wheel from moving in the opposite direction from that in which it has been previously moving, thus in ascending a steep grade, should the operator be apprehensive, he may set the brake mechanism so that it will operate in case the engine should stall. When the apparatus is so set, the contacts 27 will be bridged by the circuit closer and the horn 29 or other alarm will be intermittently sounded by the vibratory movement of the respective pawl 6 or 7 as the case may be. Should the operator be compelled to stop on a down grade, the lever 10 is moved in the other direction so that the other pawl will be thrown into engagement with its ratchet wheel. If the operator desires to lock the vehicle when he leaves it standing, he may move the lever 10 so as to lock the machine against either forward or backward movement and then in case an unauthorized person should attempt to move the vehicle, the alarm will be sounded by the closing of the alarm circuit in the manner above described.

I claim:—

1. The combination with a rotary shaft of a motor vehicle, of a pair of ratchet wheels fast on said shaft and having their teeth facing in opposite directions, a pair of pawls arranged to coöperate with said ratchet wheels, means for setting either one of said pawls in position to coöperate with the respective ratchet wheels, each of said pawls when set being held in yielding engagement with its ratchet wheel, and flexible means for limiting the movement of each pawl toward its operative position.

2. The combination with a rotary shaft of a motor vehicle, of a pair of ratchet wheels fast on said shaft and having their teeth facing in opposite directions, a pair of pawls arranged to coöperate with said ratchet wheels, means for setting either one of said pawls in position to coöperate with the respective ratchet wheel, the pawl setting means comprising a lever common to both pawls, and means for locking said lever in one of several predetermined positions.

3. The combination with a rotary shaft of a motor vehicle, of a ratchet wheel fast on said shaft, a pawl movable into and out of engagement with said ratchet wheel, means for setting said pawl either in an operative or inoperative position, and a circuit closer carried by said pawl and arranged to close an alarm circuit when the pawl is set in its operative position.

In testimony whereof I affix my signature.

JAMES DOUCETTE.